United States Patent [19]
Ruark

[11] Patent Number: 5,245,877
[45] Date of Patent: Sep. 21, 1993

[54] TONG LOAD CELL ASSEMBLY

[75] Inventor: Graham M. Ruark, Houston, Tex.

[73] Assignee: Weatherford U.S., Inc., Houston, Tex.

[21] Appl. No.: 668,199

[22] Filed: Mar. 12, 1991

[51] Int. Cl.$^5$ ............................................. G01L 1/04
[52] U.S. Cl. .................. 73/862.621; 73/726; 73/862.25
[58] Field of Search ............... 73/862.25, 862.65, 720, 73/721, 726, 727, 774, 779, 780, 781, 782, 862.621, 862.629, 862.636; 81/467, 57.15, 57.16, 57.24, 57.34, 57.35; 338/4

[56] References Cited

U.S. PATENT DOCUMENTS

| | | | |
|---|---|---|---|
| 2,756,592 | 7/1956 | Foster | 73/862.39 |
| 4,082,017 | 4/1978 | Eckel | 81/57.16 |
| 4,125,040 | 11/1978 | True | 81/429 |
| 4,246,809 | 1/1981 | Keast et al. | 81/57.16 |
| 4,289,021 | 9/1981 | Nelson | 73/862.25 |
| 4,290,304 | 9/1981 | Eckel | 73/862.25 |
| 4,401,000 | 8/1983 | Kinzbach | 81/57.2 |
| 4,402,239 | 9/1983 | Mooney | 81/57.16 |
| 4,611,678 | 9/1986 | Andriewsky | 73/862.65 X |
| 4,770,049 | 9/1988 | Jones et al. | 73/862.65 |
| 4,785,896 | 11/1988 | Jacobson | 73/862.65 X |
| 4,957,002 | 9/1990 | Coyle, Jr. et al. | 73/862.21 X |
| 4,957,177 | 9/1990 | Hamilton et al. | 177/211 |
| 4,972,741 | 11/1990 | Sibille | 81/57.16 |
| 5,081,888 | 1/1992 | Schulze-Beckinghausen | 81/57.16 |

FOREIGN PATENT DOCUMENTS

| | | |
|---|---|---|
| 9006418 | 12/1988 | European Pat. Off. . |
| 2730021 | 1/1979 | Fed. Rep. of Germany . |
| 3737120 | 12/1988 | Fed. Rep. of Germany ........ 73/826 |
| 2049517 | 4/1979 | United Kingdom . |

OTHER PUBLICATIONS

EPO Patent Application 0 171 187 Feb. 1986.
"General Services and Products Catalog 1988-89".
"Speedtork Hydraulic Drilling Tongs," Weatherford, 1990.
"Dillon Bulletin #100.2" W. C. Dillon & Co., Inc. 1982.
"Dillon Bulletin #500.1," W. C. Dillon & Co., Inc. 1982.

*Primary Examiner*—Herbert Goldstein
*Assistant Examiner*—Elizabeth L. Shopbell
*Attorney, Agent, or Firm*—Guy McClung

[57] ABSTRACT

An apparatus and method including a load cell mounting apparatus movably mounted on a load cell which applies either of two types of loads to the load cell as one type of load. The apparatus and method for applying either a tensile load or a compressive load to a load cell as a tensile load; and a tong assembly with such apparatus or in another aspect, for applying either a tensile load or a compressive load to a load cell as a compressive load; and, a tong assembly with such apparatus.

9 Claims, 7 Drawing Sheets

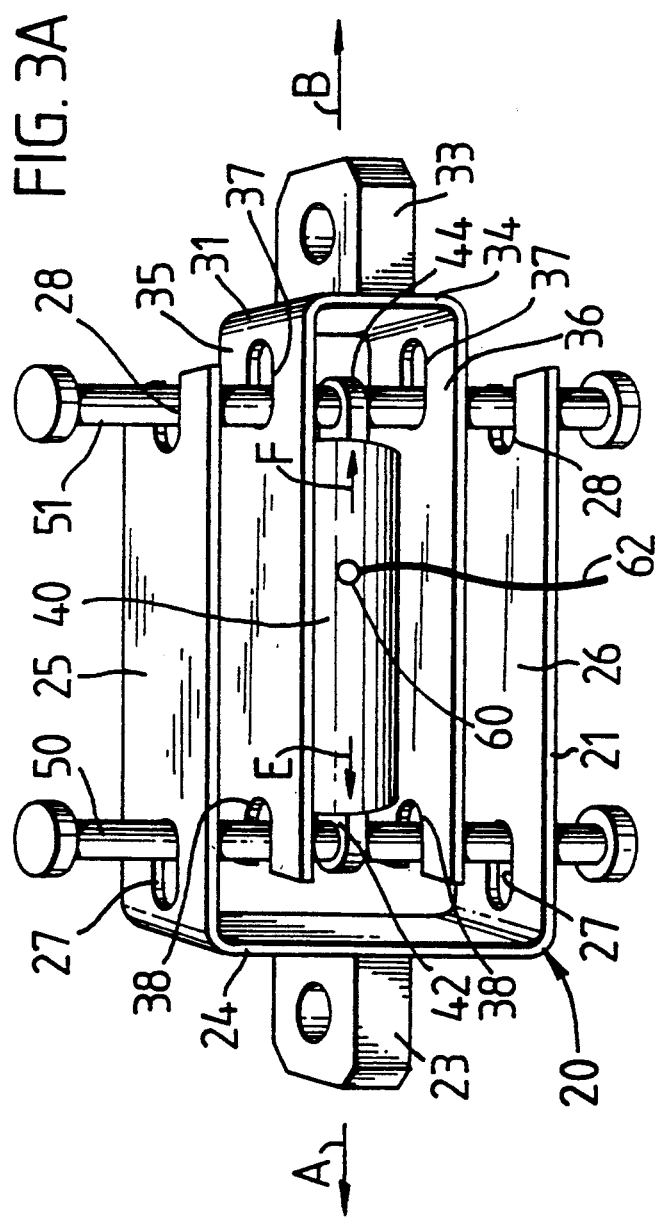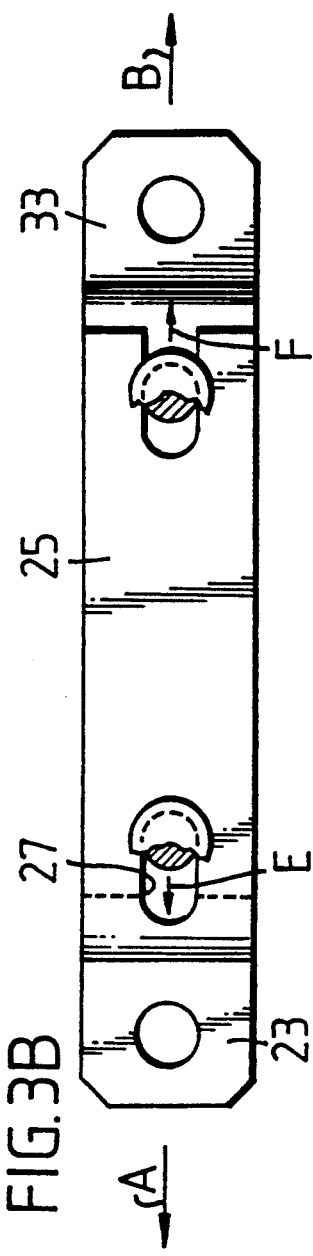

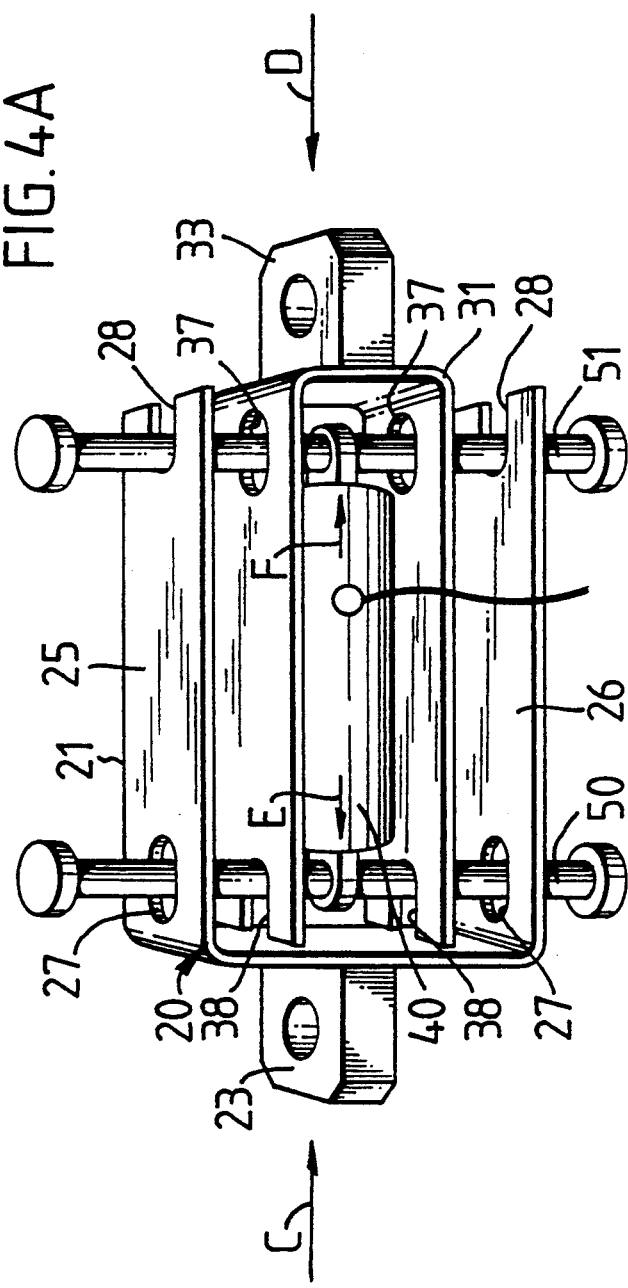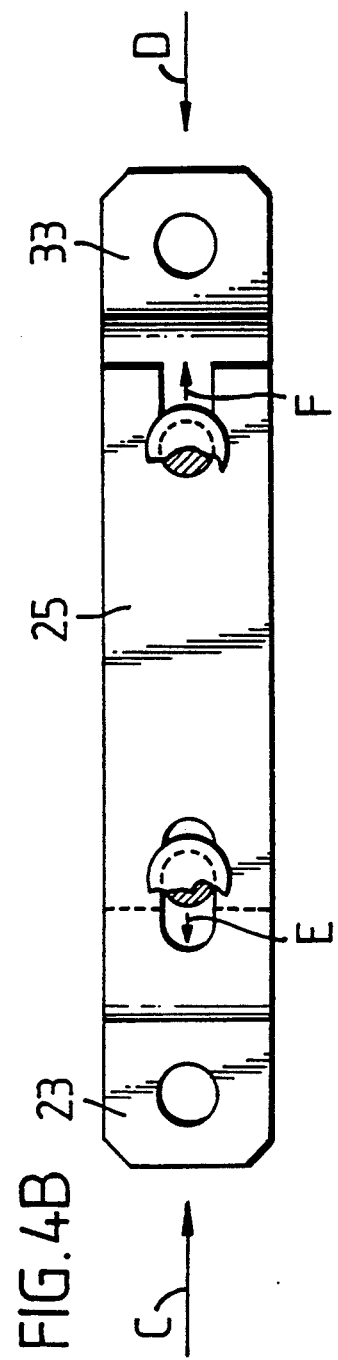

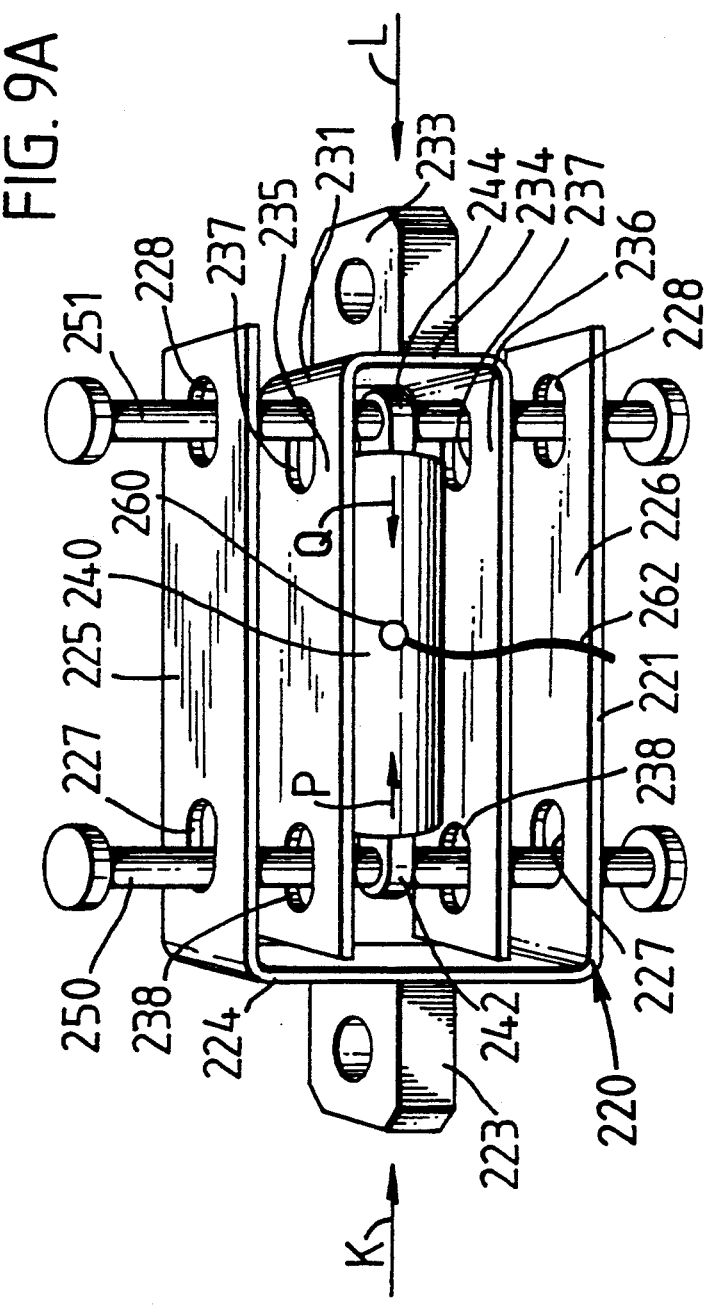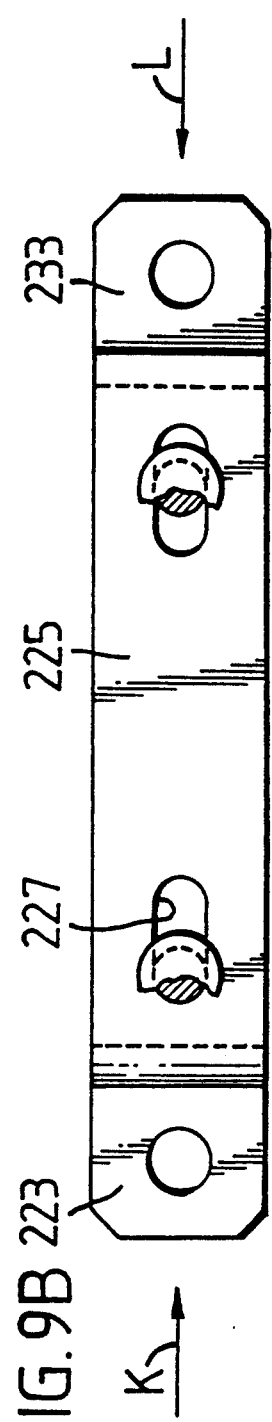

TONG LOAD CELL ASSEMBLY

BACKGROUND OF THE INVENTION

1. Field of The Invention

This invention is related to tongs, and particularly to tong load cell assemblies and methods of their use.

2. Description Of Related Art

In virtually every industrial field there is at least some requirement for assembling and disassembling members having mating threaded connections such as, pipe, rods and bolts. Perhaps the best known requirement for making-up (or breaking-out) of such members exists in the well drilling and servicing industries, particularly that involving exploration for, and production of, oil and gas wells. In the oil and gas field, depending on the phase of operations being conducted, miles of drill pipe, hole casing or production tubing are necessarily assembled at the surface on a piece-by-piece basis. Similarly, each time it becomes necessary to remove pipe, casing or tubing from the borehole (for bit changes, pipe repair, pipe salvage or many other reasons), the string of pipe is progressively lifted from the hole, and disassembled at the surface on a piece-by-piece basis. Because of the need to repetitively make and break threaded member connections, various apparatus, generally referred to as tongs, more specifically lead tongs and back-up tongs, have been developed to facilitate that task. In each make-up of a joint of two threaded members a specific torque should be applied. Some means is used to "hold" the tongs "in place", that is, restrain them from rotating about the pipe axis during tightening or loosening, usually by snubbing lines or by means interconnecting the tongs.

When a lead tong is operated, a rotary element contained within the tong body grasps a first threaded member. A motor, usually hydraulic, contained within the lead tong body generates a "driving torque" which is applied to the rotary element to rotate it, and the first threaded member therein, in the desired direction. By operation of Newton's third law of physics (that is, in essence, "for every force there exists an equal and opposite force"), creation of the "driving torque" (which is applied to the threaded member) results in a "reaction torque", which is applied to the lead tong body in the opposite direction. This reaction torque must be counteracted, to secure the lead tong body from spinning about the pipe rather than driving the pipe itself.

When manual tongs were used an upper tong was conventionally interconnected by a cable and torque gauge to a powered winch, and a lower tong was connected oppositely thereof through a cable to a point of anchorage on the drilling rig. When the winch was activated, the connecting cable would turn the so-called "pipe tongs" to rotate the upper joint until the torque gauge registered the torque considered to effect a fluid-tight seal, (during make-up of the drill string) or to break the threaded connection in the case of disassembly of the drill string. The snubbing cable attached to the lower tong would, of course, secure the lower tong and thus the box portion of the lower joint of drill pipe from rotation during this process.

When a back-up tong is used with a lead power tong, it is advantageous to ascertain the relative torque between the two units during operation hence some degree of mutual freedom between the two tongs permits a relative torque measurement to be made therebetween. To assure mechanical integrity of a joint and its leak tightness, it is desirable to measure the torque used to make-up a joint.

In a typical situation, the two tongs are interconnected by a framework or mounting apparatus and two tension load cells, one load cell on each side of the assembly provides tensile load readings when the tongs are operated for joint make-up or break out. Alternatively, one load cell is employed and is switched from one side of the assembly to the other as needed, always measuring a tensile load.

A variety of load cells are commercially available, including hydraulic load cells and tension links. Load cells are available that read in both tension and compression but they are relatively expensive; have specific associated electronic devices and software; may be difficult to calibrate; and often provide lower measurement resolution. These disadvantages outweigh the benefits that can be obtained by using only one such load cell.

In accordance with 37 C.F.R. §1.56 the following are disclosed:

U.S. Pat. No. 4,972,741 discloses a tong apparatus and discusses the measurement of tong torque with typical load cells.

U.S. Pat. No. 4,957,177 discloses a dual beam moment-insensitive load cell.

U.S. Pat. No. 4,402,239 discloses a tong and a torque gauge interconnected between a tong and a snubbing cable and a typical torque sensor.

U.S. Pat. No. 4,401,000, commonly owned with the present invention, discloses a power tong.

U.S. Pat. No. 4,290,304 discloses a back-up tong and a power tong used together and the use of typical load cells with a "stinger" assembly or arm which acts against a load cell.

U.S. Pat. No. 4,246,809 discloses a tong apparatus with a lead tong and a back-up tong.

U.S. Pat. No. 4,125,040, commonly owned with this invention, discloses tong control apparatus that uses typical strain gauges or the like in a back-up line and transducers.

U.S. Pat. No. 4,082,017 discloses power tong apparatus including an upper and a lower tong.

"General Services and Products Catalog 1988-89," Weatherford discloses a variety of tongs (pages 26-30), tong services (pages 8, 9, 15) and a load cell device (page 13).

"Speedtork Hydraulic Drilling Tongs," Weatherford, 1990 discloses a tong assembly using two load cells.

"Dillon Bulletin #100.2" W. C. Dillon & Co., Inc., 1982 discloses load cells.

"Dillon Bulletin #500.1," W. C. Dillon & Co., Inc., 1982 discloses strain gage load cells.

There has long been a need for an easy and efficient way to ascertain tong torque measurements. There has long been a need to reduce the need for using two tension-indicating load cells when using a lead and a back-up tong.

SUMMARY OF THE PRESENT INVENTION

The present invention, in one embodiment, discloses an assembly for a tong load cell which permits a tension-indicating load cell alone (or a compression-indicating load cell alone) to indicate both a tensile load and a compressive load so that a single load cell is needed for torque measurements in both make-up and break-out operations utilizing lead and back-up tongs.

In one aspect the assembly includes an outer bracket having a first connection arm for interconnecting it with one tong, e.g. an upper lead power tong, and an inner bracket with a second connection arm for interconnecting the inner bracket with another tong, e.g. a lower back-up tong. In one embodiment, a tension-indicating load cell alone is disposed within the brackets, one end of the load cell having a first rod extending therethrough which also extends through holes and recesses in the outer bracket and the other end of the load cell has a second rod extending therethrough which also extends through holes and recesses in the inner bracket so that the load cell can measure a tensile load during either joint make-up or break-out. Also, the holes in both brackets are configured so that, when a compressive load is applied, the connection arms push against the rods mimicking a tensile load. In this way regardless of which direction in which a tong is being moved, the load cell always reads in tension. Thus only one, not two, tension-indicating load cells are needed and a more complex tension and compression indicating cell is not required.

In another embodiment of a load cell assembly according to invention, a load cell that indicates a compressive load is mounted between two plates so that a tensile load on the plates is transferred to the load cell as a compressive load and a compressive load is transferred to the load cell as a compressive load.

Load cell assemblies according to the present invention can be disposed substantially perpendicular to a tong's axis and/or to the pipe axis so that correct load measurements are made.

It is, therefore, an object of the present invention to provide new, useful, unique, efficient, safe and effective devices and methods for indicating tong torque measurements.

Another object of the present invention is the provision of such devices and method which need only one load cell to provide readings of both tensile and compressive loads.

Yet another object of the present invention is the provision of such methods and devices which eliminate the need for two load cells for tong torque readings.

Another object of the present invention is the provision of such devices and methods which make it possible for a tension-indicating load cell to measure a compressive load.

Yet another object of the present invention is the provision of such devices and methods which eliminate the need to reattach and reassemble a load cell apparatus when alternating between make-up and breakout when using a single load cell and when using either a single tong or tongs in combination.

A further object of the present invention is the provision of tong load cell assemblies with which the load cell is disposed substantially perpendicular to the tong axis and/or to the pipe axis for more accurate load measurements.

The present invention recognizes and addresses the previously-mentioned long-felt needs and provides a satisfactory meeting of those needs in its various possible embodiments. To one of skill in this art who has the benefits of this invention's teachings and disclosures, other and further objects and advantages will be clear, as well as others inherent therein, from the following description of presently-preferred embodiments, given for the purpose of disclosure, when taken in conjunction with the accompanying drawings. Although these descriptions are detailed to insure adequacy and aid understanding, this is not intended to prejudice that purpose of a patent which is to claim an invention no matter how others may later disguise it by variations in form or additions of further improvements.

DESCRIPTION OF THE DRAWINGS

So that the manner in which the above-recited feature, advantages and objects of the invention, as well as others which will become clear, are attained and can be understood in detail, more particular description of the invention briefly summarized above may be had by reference to certain embodiments thereof which are illustrated in the appended drawings, which drawings form a part of this specification. It is to be noted, however, that the appended drawings illustrate preferred embodiments of the invention and are therefore not to be considered limiting of its scope, for the invention may admit to other equally effective equivalent embodiments.

FIG. 3A is a side view of a load cell assembly according to the present invention with a tensile load on it. FIG. 3B is a top view of the assembly of FIG. 3A.

FIG. 4A is a side view of the assembly of FIG. 3A with a compressive load on it, and FIG. 4B is a top view of the assembly of FIG. 4A.

FIGS. 9A and 9C are side views of a load cell assembly according to the present invention and FIGS. 9B and 9D are top views of the load cell assembly of FIGS. 9A and 9C.

DESCRIPTION OF EMBODIMENTS PREFERRED AT THE TIME OF FILING FOR THIS PATENT

Figure 1:
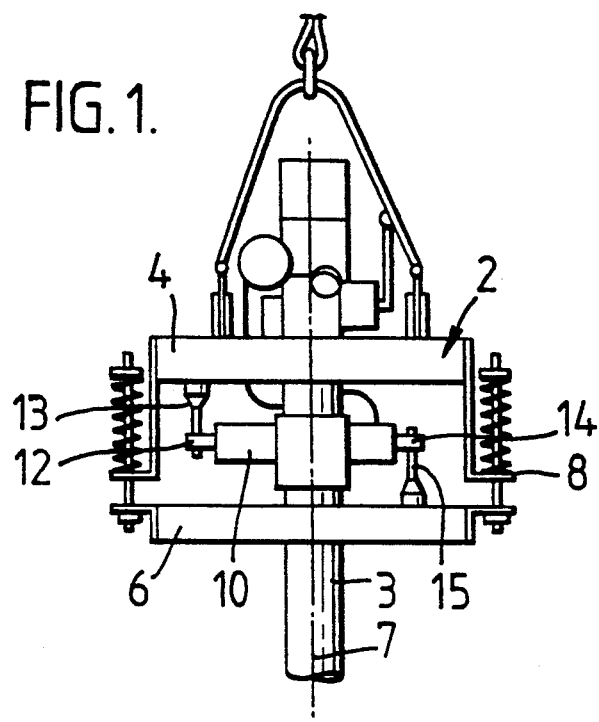
FIG. 1 is a front view of a tong assembly with a load cell assembly according to the present invention.

Referring now to FIG. 1, a tong assembly 2 about a pipe 3 has a top lead power tong 4, a bottom power back-up tong 6, and a framework 8 that interconnects the tones and permits some freedom of movement between the two tongs. Also interconnected between the two tongs is a tong load cell assembly 10 according to the present invention which has a first connection arm 12 secured to a rod 13 which in turn is secured to the lead tong 4 and a second connection arm 14 secured to a rod 15 which in turn is secured to the back-up tong 6. The load cell assembly 10 reads, in tension, both tensile and compressive loads. The load cell is disposed at substantially a right angle to an axis 7 of the pipe and also perpendicular to a central horizontal axis (not shown, but like axis T in FIG. 2) of the tongs so that no correction for deviation from 90 degrees is needed.

tong load cell assembly 20 according to the present invention, like the assembly 10 in FIG. 1, is shown in FIGS. 3A, 3B, 4A and 4B. The load cell assembly 20 has an outer bracket 21 with a first connecting arm 23 secured to a vertical beam 24 from which extend a top beam 25 and a bottom beam 26. The beams 25 and 26 each have a hole 27 and a recess 28 through which pass rods 50 and 51, respectively.

An inner bracket 31 disposed generally between the top and bottom beams of the top bracket 20 has a second connecting arm 33 secured to a vertical beam 34 from which extend an upper beam 35 and a lower beam 36. The beams 35 and 36 each have a hole 37 and a recess 38 through which pass the rods 50 and 51, respectively.

A tension-indicating load cell 40 is disposed generally within the inner bracket 31 and has one connector 42 secured about rod 50 and another connector 44 secured about the rod 51. Typical commercially available load cells such as a Hardy Instruments load cell no. 5501-0085-02 may be used.

Due to the configuration and size of the holes 27, 37 and the recesses 28, 38 (which are all larger than the rods that pass through them) the brackets 21 and 31 are movable with respect to the rods 50 and 51. This and the relative disposition of the brackets and the load cell permits the tension-indicating load cell to indicate both a tensile and a compressive load from a tong, tong assembly, or other apparatus to which the load cell assembly is connected.

This is illustrated in the relative movement shown in FIGS. 3A and 4A. In FIG. 3A, the rod 50 is pushed outwardly by the inner edges of the holes 27 and the edges of the recesses 28 do not restrain the rod 51, while the inner edges of the holes 37 push the rod 51 outwardly and the edges of the open recesses 38 do not restrain the rod 50. The reverse occurs in FIG. 4A with the inner edges of the recesses 28 and 38 acting on the rods while rod movement is permitted in the properly sized holes 27 and 37.

As shown in FIG. 3A, a tensile load applied in the direction of either arrow A or arrow B causes the outer bracket 21 to pull the rod 50 away from the load cell 40 and the inner bracket 31 to pull the rod 51 away from the load cell 40, thus producing an indication of the tensile load.

As shown in FIG. 4A, a compressive load in the direction of either arrow C or arrow D causes the inner edges of the recesses 28 of the outer bracket 21 to push the rod 51 away from the load cell 40 and the inner edges of the recesses 38 of the inner bracket 31 to push the rod 50 away from the load cell 40, thus producing an indication of the compressive load. Arrows E, F in FIGS. 3A, 3B, 4A, and 4B indicate that whether a tensile load or a compressive load is applied to the overall assembly, a tensile load is applied to the load cell.

The holes 27 and 37 are elongated to provide sufficient space for the required movement of the rods 50 and 51. A cable 62 extends from a transducer output connector 60 and carries the load indicating signal to a monitoring instrument (not shown).

A tong load cell assembly 200 according to the present invention is shown in FIGS. 9A, 9B, 9C and 9D. The load cell assembly 220 has an outer bracket 221 with a first connecting arm 223 secured to a vertical beam 224 from which extend a top beam 225 and a bottom beam 226. The beams 225 and 226 each have a hole 227 and a hole 228 through which pass rods 250 and 251 respectively.

An inner bracket 231 disposed generally between the top and bottom beams of the outer bracket 221 has a second connecting arm 233 secured to a vertical beam 234 from which extend an upper beam 235 and a lower beam 236. The beams 235 and 236 each have a hole 237 a hole 238 through which pass the rods 251 and 250, respectively.

A compression-indicating load cell 240 is disposed generally within the inner bracket 232 and has one connector 242 secured about rod 250 and another connector 244 secured about the rod 251. Typical commercially available load cells may be used.

Figure 9C:
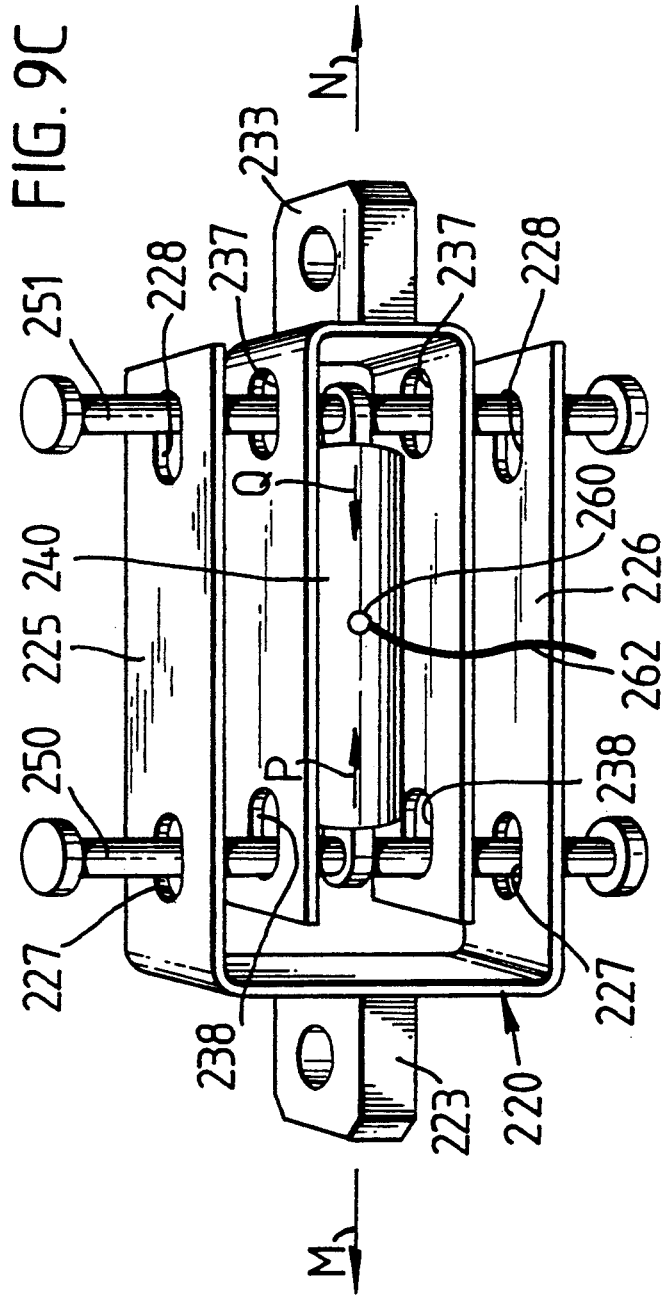
Figure 9D:
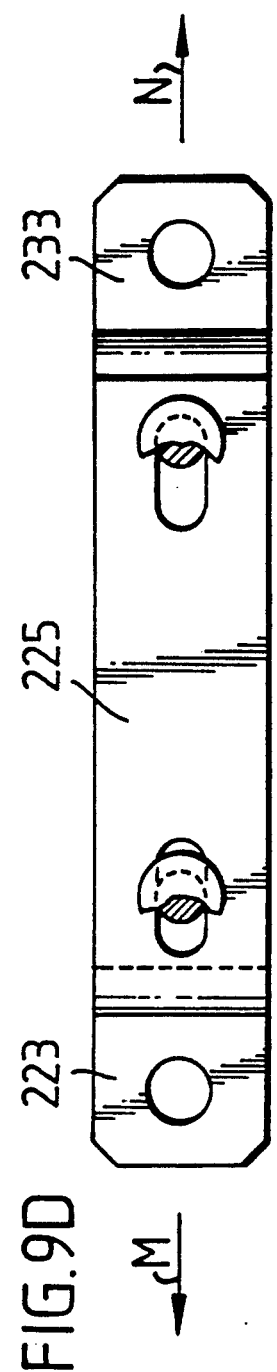

Due to the configuration and size of the holes 227, 228, 237 and 238 (which are all larger than the rod that passes through them) the brackets 221 and 231 are movable with respect to the rods 250 and 251. This and the relative disposition of the brackets and the load cell permits the load cell 240 to indicate both a tensile and a compressive load from a tong, a tong assembly or other apparatus to which the load cell assembly is secured. This is illustrated in the relative movement shown in FIGS. 9A and 9C. In FIG. 9A, the rod 250 is pushed inwardly by the inner edges of the holes 227 and the edges of the holes 228 do not restrain the rod 251, while the inner edges of the holes 237 push the rod 251 inwardly and the edges of the holes 238 do not restrain the rod 250. The reverse occurs in FIG. 9C with the inner edges of the holes 228 and 238 acting on the rods while rod movement is permitted in the properly sized holes 227 and 237.

As shown in FIG. 9A, a compressive load applied in the direction of either arrow K or arrow L causes the inner bracket 231 to push the rod 251 toward the load cell 240 and the outer bracket 221 to push the rod 250 toward the load cell 240, thus producing an indication of the compressive load. A cable 262 extends from a transducer output connector 260 and carries the load indicating signal from the load cell to a monitoring and/or recording instrument (not shown).

As shown in FIG. 9C, a tensile load in the direction of either arrow M or arrow N causes the inner edges of the holes 228 of the outer bracket 221 to push the rod 251 toward the load cell 240 and the inner edges of the holes 238 of the inner bracket 231 to push the rod 250 toward the load cell 240, thus producing an indication of the tensile load. Arrows P, Q in FIGS. 9A and 9C indicate that whether a tensile load or a compressive load is applied to the overall assembly, a compressive load is applied to the load cell.

Figure 2:
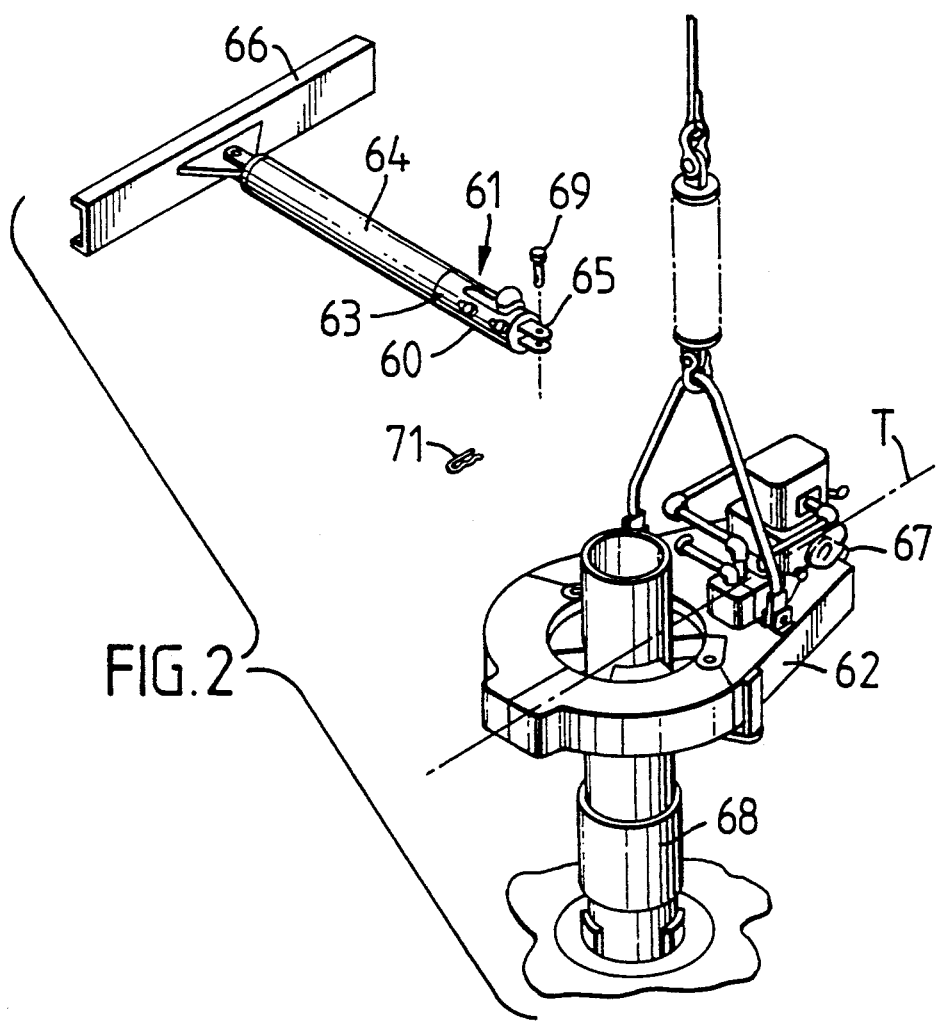
FIG. 2 is a perspective view, partially exploded, of a tong load cell assembly according to this invention in use with a tong.

FIG. 2 illustrates a tong load cell assembly 61 according to the present invention (like the assemblies 10 and 20 described above) with a single tong 62. The assembly 61 is secured between the tong 62 and a connecting arm 64 that is secured to another member such as a rig 66. A connection end 65 of the assembly 61 (like the connection arm 33, FIG. 3A) is connected to a holding member 67 at the rear of the tong 62 with a bolt 69 and cotter pin 71. The embodiment shown in FIG. 2 has a generally cylindrical outer housing 63 and the brackets within it (not shown; like the brackets of the embodiment of FIG. 3A) are much closer together (e.g. clearance between moving parts of 0.06 inches) than the brackets shown in FIG. 3A but the same results are accomplished. Thus when the tong 62 is used for either make-up or break-out of a tubular threaded joint 68 (i.e. when the load cell senses either a tensile or a compressive load) a load cell within the assembly 61 (not shown) will indicate the load.

Figure 5:
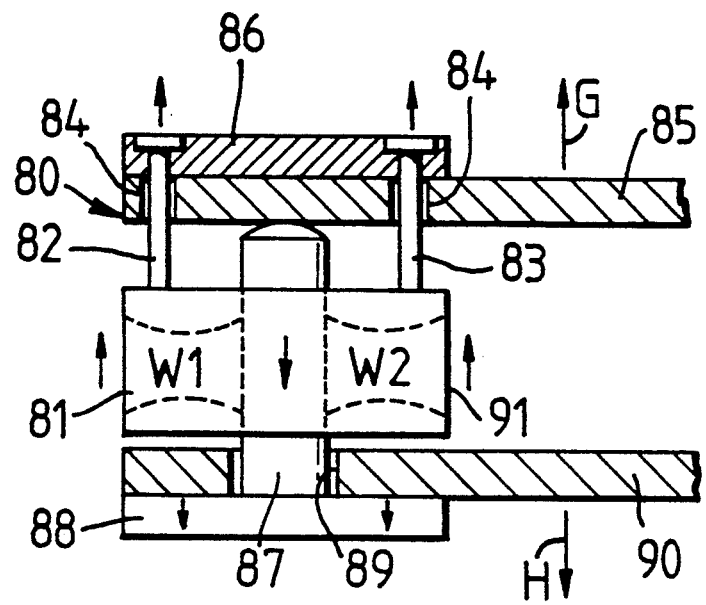
FIGS. 5 and 6 are side views, partially in cross-section of a load cell assembly according to the present invention.
Figure 6:
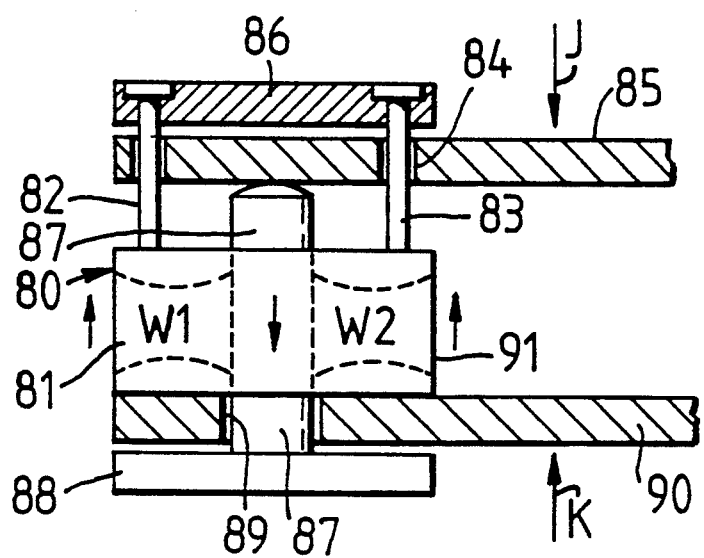
Figure 7:
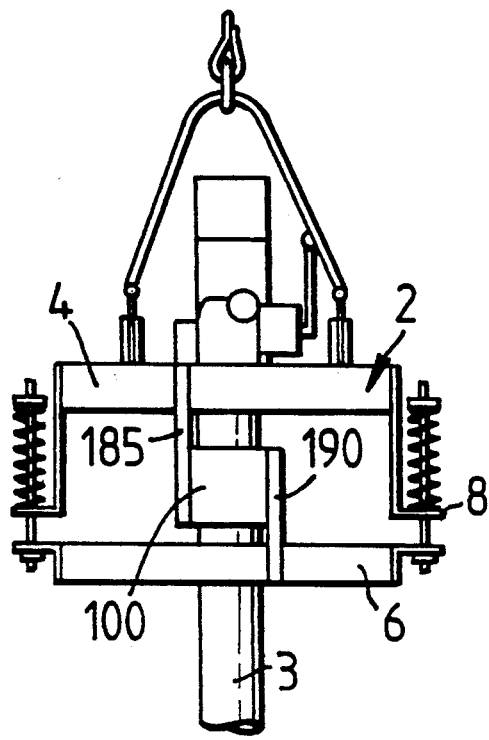
FIG. 7 is a front view of a load cell assembly as in FIG. 5 with tone assembly according to the present invention.

A load cell assembly 80 according to the present invention is shown in FIGS. 5-7. A compression-indicating load cell 81 has two rods 82 and 83 secured to a load cell body 91. The rods 82 and 83 which freely extend through holes 84 in a top plate 85. The rods are secured to an upper plate 86. The load cell 81 has a central member 87 which itself is secured the body 91 and to a lower plate 88. The central member 87 freely extends through an opening 89 in a bottom plate 90. By appropriately orienting the plates 85 and 90 (see e.g. FIG. 7), they can be secured to items, e.g. a tong or tongs, which will induce a load on the assembly 80. Any typical compression load cell responsive to a compressive load may be used. As shown in FIG. 5, a tensile load indicated by arrows G, H causes plates 85 10 and 90 to coact with plates 86 and 88 to induce a compressive load on the load cell 81. As shown in FIG. 6, a compressive load indicated by arrows J, K, cause plate 85 to push.

Referring now to FIG. 7, a tong assembly 2 about a pipe 3 has a top lead power tong 4, a bottom power back-up tong 6, and a framework 8 that interconnects the tongs and permits some freedom of movement between the two tongs. Also interconnected between the two tongs is a tong load cell assembly 100 according to the present invention which is like the assembly 80 in FIGS. 5 and 6. Plates 185 and 190 correspond to plates 85 and 90 in FIG. 5, respectively, except plate 190 extends in a different direction away from the assembly 100 than does the plate 90 from assembly 80.

The load cell (not shown) of the load cell assembly 100 reads, in compression, both tensile and compressive loads on the assembly.

Figure 8:
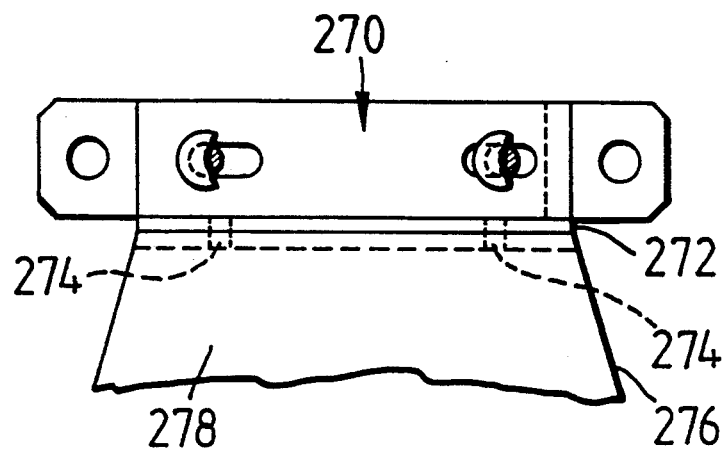
FIG. 8 is a top view of a tong assembly (partially shown) and a load cell assembly secured thereto according to the present invention.

The load cell in the assembly 100 is perpendicular to central horizontal axes of the tongs 2 and 6 and is perpendicular to the vertical axis of the pipe 3. As shown in FIG. 8, a load cell assembly 270 (like those shown in FIGS. 3A or 9A) has a side plate 272 through which extend bolts 274 securing the load cell assembly 270 to a housing 276 of a tong 278 (shown partially in FIG. 8). Such a connection of the load cell assembly to a tong assembly insures that the load cell itself in the load cell assembly will be perpendicular to the tong's central horizontal axis. (Not shown in FIG. 8, but like the load cell in either FIG. 3A or FIG. 9A.)

In conclusion, therefore, it is seen that the present invention and the embodiments disclosed herein are well adapted to carry out the objectives and obtain the ends set forth at the outset. Certain changes can be made in the method and apparatus without departing from the spirit and the scope of this invention. It is realized that changes are possible and it is further intended that each element or step recited in any of the following claims is to be understood as referring to all equivalent elements or steps for accomplishing substantially the same results in substantially the same or equivalent manner. It is intended to claim the invention broadly in whatever form its principles may be utilized. The present invention is, therefore, well adapted to carry out the objects and obtain the ends and advantages mentioned, as well as others inherent therein.

What is claimed is:

1. A load cell assembly comprising
a load cell for indicating a tensile load thereon,
load cell mounting apparatus movably mounted on the load cell and movable with respect to the load cell,
the load cell mounting apparatus applying a tensile load imposed on the load cell mounting apparatus to the load cell as a tensile load, and applying a compressive load imposed on the load cell mounting apparatus to the load cell as a tensile load.

2. The load cell assembly of claim 1 wherein the load cell mounting apparatus comprises
an outer bracket connectible to a load-inducing device, the outer bracket having outer holes therein for receiving and in which is held a first rod secured to a first end of the load cell and having outer open recesses therein for receiving and inner edges of which co-act with a second rod secured to a second end of the load cell, the holes and recesses spaced apart from each other,
an inner bracket disposed partially within the outer bracket and connectible to a load-inducing device, the inner bracket having inner holes therein for receiving and in which is held the second rod and having inner open recesses for receiving and inner edges of which co-act with the first rod, and
the inner bracket disposed partially within the outer bracket and the load cell connected to the rods so that either a tensile load or a compressive load applied to the load cell assembly is applied to the load cell as a tensile load.

3. The load cell assembly of claim 2 wherein the load cell is disposed within the inner bracket.

4. The load cell assembly of claim 2 comprising also a cylindrical housing enclosing both brackets and the load cell.

5. A load cell assembly comprising
a load cell for indicating a compressive load thereon,
load cell mounting apparatus movable mounted on the load and movable with respect to the load cell,
the load cell mounting apparatus applying a tensile load imposed on the load cell mounting apparatus to the load cell as a compressive load, and applying a compressive load imposed on the load cell mounting apparatus to the load cell as a compressive load
the load cell assembly further comprising
an outer bracket connectible to a load-indicating device, the outer bracket having first outer holes therein for receiving and holding a first rod secured to a first end of the load cell and having second outer holes therein for receiving and co-acting with a second rod secured to a second end of the load cell, the holes spaced apart from each other,
an inner bracket disposed partially within the outer bracket and connectible to a load-inducing device, the inner bracket having second inner holes therein for receiving and holding the second rod and having first inner holes for receiving and co-acting with the first rod, and
the inner bracket disposed partially within the outer bracket and the load cell connected to the rods so that either a tensile load or a compressive load applied to the load cell assembly is applied to the load cell as a compressive load.

6. The load cell assembly of claim 5 wherein the load cell is disposed within the inner bracket.

7. The load cell assembly of claim 5 comprising also a cylindrical housing enclosing both brackets and the load cell.

8. A tong assembly comprising
a lead power tong,
a back-up tong,
a load cell assembly interconnected between the tongs, the load cell assembly comprising
a load cell for indicating a tensile load thereon, load cell mounting apparatus movably mounted on the load cell and movable with respect to the load cell, the load cell mounting apparatus applying a tensile load imposed on the load cell assembly by either of the tongs as a tensile load on the load cell, and the load cell mounting apparatus applying a compressive load imposed on the load cell assembly by either of the tongs as a tensile load on the load cell.

9. The tong assembly of claim 8 wherein a framework secured to both tongs permits relative movement of the tongs, and the load cell assembly comprises an outer bracket connected to the lead power tong, the outer bracket having outer holes therein for receiving and holding a first rod secured to a first end of the load cell and having outer open recesses therein for receiving and co-acting with a second rod secured to a second end of the load cell, the holes and recesses spaced apart from each other, an inner bracket disposed partially within the outer bracket and connected to the back-up tong, the inner bracket having inner holes therein for receiving and holding the second rod and having inner open recesses for receiving and co-acting with the first rod, the inner bracket disposed partially within the the outer bracket and the load cell connected to the rods so that either a tensile load or a compressive load applied to the load cell assembly by either tong is applied to the the load cell as a tensile load.

* * * * *